Feb. 12, 1929. 1,701,567
R. HESS
GRASS MOWER
Filed April 26, 1926
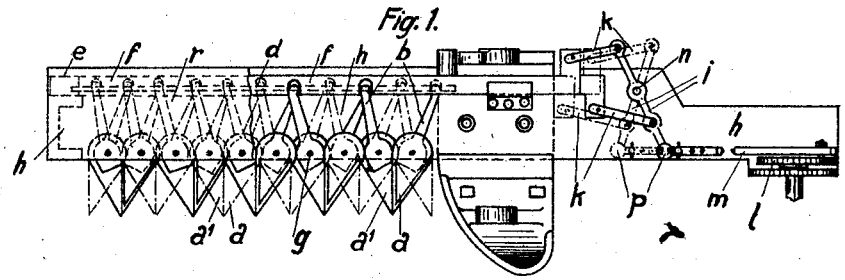
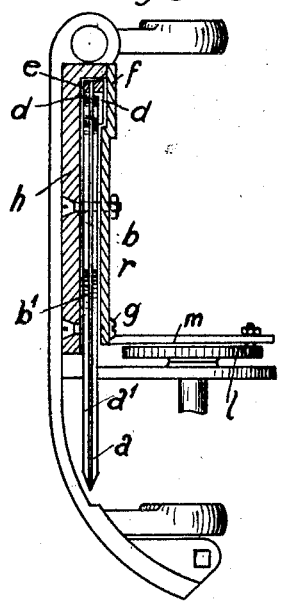
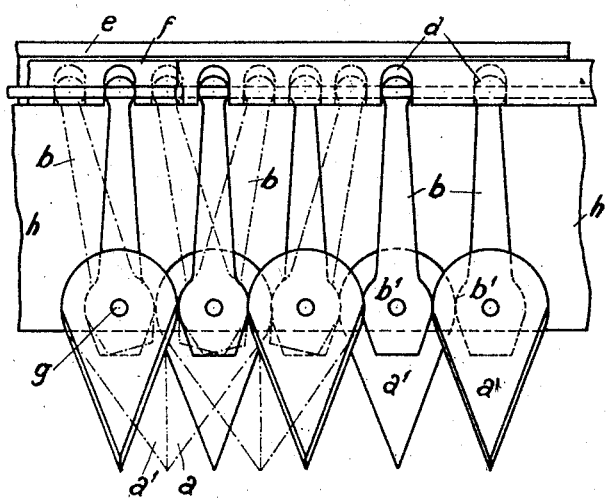
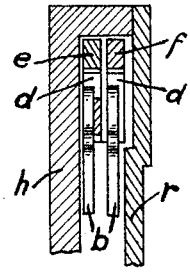
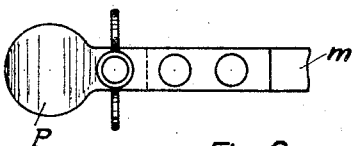
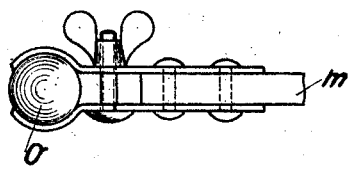

Patented Feb. 12, 1929.

1,701,567

UNITED STATES PATENT OFFICE.

RICHARD HESS, OF BURKHARDSWALDE, NEAR PIRNA, GERMANY.

GRASS MOWER.

Application filed April 26, 1926, Serial No. 104,699, and in Germany May 1, 1925.

This invention relates to a grass mower the knives of which, cutting like scissors, have arc-shaped inner ends and are operated by knife bars. In machines of this type of known construction the knives are pivotally connected for instance to a finger bar, the inner arc-shaped ends of the knives being sunk into a plate so that this plate is flush with the knives. The object of this arrangement, to prevent clogging or jamming of the cutting mechanism by the material which is cut or by other foreign bodies, is not attained for the reason that the fingers which operate the knives form too short lever arms.

According to the invention shank-like elements are arranged alternately underneath and above the knives, the ends of said elements which are fixed on the knives having arc-shaped side edges. The center of these arc-shaped side edges coincides with the pivot point of the knives and the diameter of the enlarged parts of the elements is so great, that the edges of the arc-shaped ends of the cutting knives abut the arc-shaped side-edges of the adjacent elements in such a manner that, in any position of the cutting knives, they are in mutual contact with the adjacent elements. The lower knives are moved from the upper knife bar and the upper knives from the lower knife bar. By the shank-like elements not only a perfect covering of the knife mechanism towards the outer side is ensured but also a uniform cutting even when more power is required.

An embodiment of the invention is shown, by way of example, in the accompanying drawing in which Fig. 1 shows in plan view the knife-mechanism.

Fig. 2 shows on larger scale some of the knives.

Fig. 3 is a side elevation partly in section of the knife-mechanism.

Fig. 4 shows on larger scale in cross section the head portion of the knife beam and in elevation the extensions of the knives.

Fig. 5 shows in top plan view a portion of the connecting rod and the claws connecting the double lever to the connecting rod.

Fig. 6 is a side elevation of Fig. 5.

On the cutting knives $a$, $a'$ arms $b$ are fixed which form extensions of the knives. The front ends of the arms are arc-shaped, the center of these arc-shaped front ends being the pivot point for the knives and the parts $b'$ of the extensions $b$ which rest upon the knives form arcs concentric to the knife-ends. The breadth of the parts $b'$ of the extensions corresponds to the interval between two adjacent knives. The knives are arranged so that the end of the one knife rests permanently upon or under the ends of the adjacent knives and bears permanently against the circular part $b'$ of the adjacent arm $b$, i. e. is permanently in touch with the same. The knives $a$, $a'$ are fixed by means of screws $g$ screwed into the knife-beam $h$, said screws serving at the same time as pivot pins for the knives. The extensions $b$ of the top knives $a$ are always under the knives and engage with cut out portions $d$ in the lower knife bar $e$, the arms $b$ of the bottom knives $a'$ engaging with cut out portions $d$ of the upper knife-bar $f$. If the cutting-knives $a$, $a'$ are pivoted around $g$ owing to the shifting of the knife-bars $e$, $f$, the cutting knives are oscillated and the side edges remain permanently in contact with the side edges om the arc-shaped parts $b'$ of the extensions $b$. A bar $r$ covers the knife-mechanism so that the same is well protected.

The knife bars $e$, $f$ are mounted so that they can easily shift upon the knife-beam $h$. The shifting is effected from a double lever $i$ through the intermediary of rods $k$. The movement of the lever $i$ is controlled by a crank-disk $l$ mounted upon the knife-beam and connected by a connecting rod $m$ to the lever $i$ which oscillates around $n$. The knife-mechanism may be manufactured and supplied independently of the other elements and it can be inserted into any existing grass mower.

The end $o$ of lever $i$ is preferably ball-shaped and this lever is connected with the connecting rod $m$ by two concave claws $p$ adjustably mounted on the connecting rod $m$, the concavity of said claws corresponding to the ball-shaped end $o$ of the lever $i$ (Figs. 5 and 6).

I claim:—

A grass mower, comprising in combination, two superposed sets of oscillatable knives said knives having arc-shaped inner ends, an upper knife bar for operating the knives of the lower set, a lower knife bar for operating the knives of the upper set, shank like elements one for each knife and fixed alterately on and under the knives, an enlarged part at that end of each element which is pivotally fixed on the knife, said enlarged part having arc-shaped side edges and the centre of said arcs coinciding with the pivot point of the corresponding knife the diameter of the enlarged part being such that the knives are permanently in contact with the sides of the enlarged parts of the two adjacent elements and said elements being of such thickness that they will freely oscillate with regard to each other so that said elements do not strike against each other.

In testimony whereof I affix my signature.

RICHARD HESS.